(12) United States Patent
Ohtomo et al.

(10) Patent No.: US 7,515,256 B2
(45) Date of Patent: Apr. 7, 2009

(54) POSITION MEASURING INSTRUMENT

(75) Inventors: Fumio Ohtomo, Tokyo (JP); Kazuki Osaragi, Tokyo (JP); Kunihiro Hayashi, Tokyo (JP)

(73) Assignee: Kabushiki Kaisha Topcon, Tokyo (JP)

( * ) Notice: Subject to any disclaimer, the term of this patent is extended or adjusted under 35 U.S.C. 154(b) by 0 days.

(21) Appl. No.: 10/686,858

(22) Filed: Oct. 16, 2003

(65) Prior Publication Data
US 2004/0135990 A1 Jul. 15, 2004

(30) Foreign Application Priority Data
Oct. 18, 2002 (JP) ............................. 2002-304224

(51) Int. Cl.
*G01C 3/08* (2006.01)
(52) U.S. Cl. .................................. 356/141.1; 356/4.01
(58) Field of Classification Search ................ 356/5.01, 356/5.04, 141.1, 141.4, 141.5, 4.01–4.07
See application file for complete search history.

(56) References Cited

U.S. PATENT DOCUMENTS

| 4,681,433 A | * | 7/1987 | Aeschlimann ............... 356/5.1 |
| 4,788,441 A | * | 11/1988 | Laskowski ............. 250/559.38 |
| 5,831,724 A | * | 11/1998 | Cordes ..................... 356/141.1 |
| 6,137,569 A | * | 10/2000 | Sasaki et al. ................. 356/153 |
| 6,188,319 B1 | * | 2/2001 | Frucht ......................... 340/557 |
| 6,411,371 B1 | * | 6/2002 | Hinderling et al. .......... 356/4.01 |
| 6,487,011 B2 | * | 11/2002 | Donath et al. ................ 359/399 |
| 6,504,602 B1 | * | 1/2003 | Hinderling .................. 356/5.1 |

FOREIGN PATENT DOCUMENTS

| CH | 676041 A5 | * | 11/1990 |
| CH | 676042 A5 | * | 11/1990 |
| EP | 661519 A1 | | 7/1995 |
| EP | 854351 A2 | * | 7/1998 |
| EP | 1016850 A2 | * | 7/2000 |

* cited by examiner

*Primary Examiner*—Isam Alsomiri
(74) *Attorney, Agent, or Firm*—Baker Botts L.L.P.

(57) ABSTRACT

The present invention relates to a position measuring instrument for, for example, scanning a photoreceiver as a target to be measured, and more particularly to an automatic position detection instrument capable of emitting distance measuring light and tracking light while turning directions of the distance measuring light and the tracking light so that three-dimensional measurement of a light receiving position is performed, and further capable of transmitting measured data to a photoreceiver provided on a target. A light source unit emits measuring light, and then a light receiving unit receives its reflected light. A scanning means emits measuring light in a scanning direction, and leads its reflected light to the light receiving unit. An angle detector detects a rotational position of the scanning means. The measuring light includes distance measuring light expanding in a fan-shaped manner. Its reflected light can be used to measure a distance to a reflector.

6 Claims, 8 Drawing Sheets

(A)

(B)

POSITION MEASURING INSTRUMENT

BACKGROUND OF THE INVENTION

The present invention relates to a position measuring instrument for scanning or tracking a photoreceiver as a target to be measured, and more particularly to an automatic position detection instrument capable of emitting distance measuring light and tracking light while turning directions of the distance measuring light and the tracking light so that three-dimensional measurement of a light receiving position is performed, and further capable of transmitting measured data to a photoreceiver provided on a target.

Heretofore, a total station is used for three-dimensional position measurement and settings. The total station has functions of measuring a distance and an angle and then outputting measured values as electric data. When performing the measurement, the total station is first placed at a reference position before placing a target at a point of measurement. Next, the target is collimated by the total station to measure a horizontal angle and an angular height. Then, a distance to a reflecting prism (corner cube) provided on the target is measured, and thereby distance data can be obtained.

Distance and angle data which have been measured are stored in an internal memory of the total station. In addition, the distance and angle data measured are output to an external memory device or a computer as data of survey work as the need arises. FIG. 7 is a diagram illustrating survey work using a total station. The total station (1000) is placed at a reference position. A target (2000a) is attached to a pole (3000a). The pole (3000a) is placed at a point of measurement by an operator (4000).

The total station (1000) comprises the following: a telescope unit; a stand for freely supporting up and down rotation of the telescope unit; a base for freely supporting horizontal rotation of the stand; and a leveling unit that is provided on the lower part of the base, and that is used to level a slant of a main body of the total station (1000) before securing it to the top of a tripod. It is to be noted that circuits, and the like, used for the distance measurement and the angle measurement are built into the total station (1000).

The operator on the total station (1000) side rotates the telescope unit up and down and right and left to find the target (2000a) at a collimation center, and then obtains a horizontal angle, an angular height, and a distance relative to the reference position.

However, in the survey work where the conventional total station (1000) is used, at least two operators, that is to say, an operator on the total station 1000 side and an operator for placing the target (2000a), are required. The number of operators increases with increase in the number of targets (2000a). However, it is difficult to measure many targets (2000a) in a moment. It is practically impossible. To be more specific, measuring time in response to the number of targets (2000a) is required for the operator to collimate the target (2000a) by use of the telescope unit, and further to perform measurement. As a result, work efficiency cannot be improved to a large extent, which was a problem.

In addition, when carrying out work concurrently in adjacent sites, each of which has a reference coordinate system different from each other, it is possible to carry out the work by use of one total station and a plurality of targets. However, every time a reference coordinate system of a measuring point changes, it is necessary to retry coordinate settings of the total station, or to switch between the coordinate systems. Accordingly, it is practically impossible to carry out the work concurrently.

SUMMMARY OF THE INVENTION

The present invention relates to an automatic position detection instrument. In the automatic position detection instrument, a light source unit emits measuring light, and then a light receiving unit receives its reflected light. A scanning means emits measuring light in a scanning direction, and leads its reflected light to the light receiving unit. An angle detector detects a rotational position of the scanning means. The measuring light includes distance measuring light expanding in a fan-shaped manner. Its reflected light can be used to measure a distance to a reflector.

BRIEF DESCRIPTION OF THE DRAWINGS

The following drawings illustrate embodiments of the present invention.

DESCRIPTION OF THE INVENTION

Embodiments of the present invention will be described with reference to drawings as below.

Figure 1:
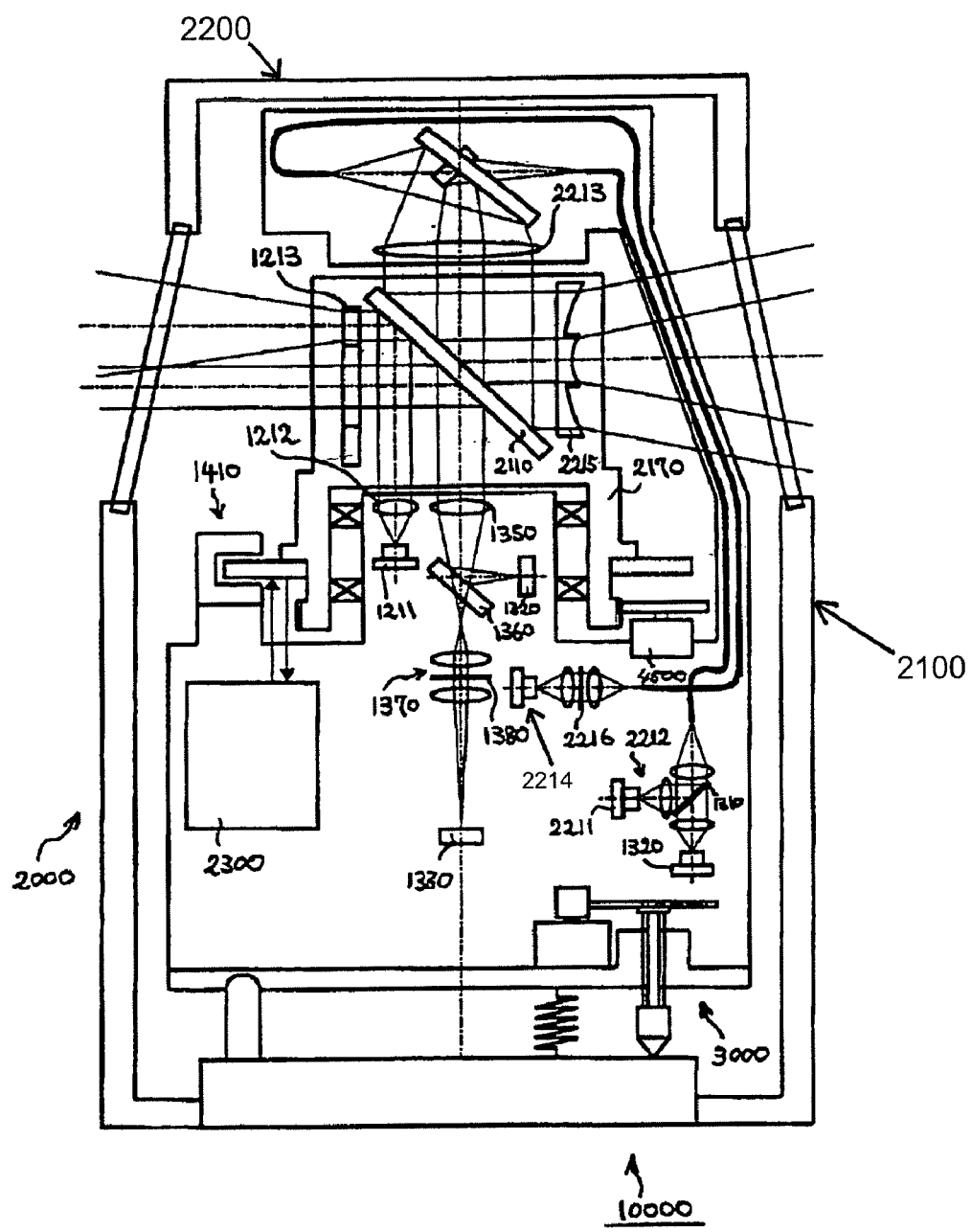
FIG. 1 is a diagram illustrating a position detection instrument according to one embodiment of the present invention.

A position detection instrument 10000 according to this embodiment will be described with reference to FIG. 1.

The surveying instrument 10000 comprises a surveying-instrument main body 2000 and a leveling unit 3000.

The surveying-instrument main body 2000 comprises a swinging unit 2100, a fixed unit 2200, and a slant measuring unit 2300.

A swinging part has a rotation axis in the vertical direction, and is capable of 360 degree rotation by use of a rotation motor.

A rotating part in the horizontal direction is used to rotate a rotating mirror 2110 in the horizontal direction. The rotating part in the horizontal direction comprises a vertical axis 2170, and the swinging unit 2100 formed on this. The rotating part is configured to rotate as one body.

In addition, a rotary encoder 2180 used for measuring a horizontal angle is mounted on the vertical axis 2170. Moreover, a horizontal drive motor 4500 is connected to the vertical axis 2170 through a drive gear. Because the horizontal drive motor 4500 is secured to a cabinet, the horizontal drive motor 4500 can rotate the swinging unit 2100 in the horizontal direction.

It is to be noted that the rotary encoder 2180 used for measuring a horizontal angle corresponds to an angle detector.

The leveling unit 3000 has a structure that basically supports the main body 2000 using three legs. One of three legs is supported by a spherical surface, for example, so that the leg can swing freely with circular movements. The remaining two legs can move up and down by driving force of a leveling drive motor. It is so devised that the main body 2000 is leveled by adjusting the up and down movement.

Leveling is carried out based on the output of the slant measuring unit. The spring supports the bases under, and the base performs for mounting the top of a tripod. Incidentally, the leveling unit 3000 is built-in the surveying-instrument main body 2000, and is able to level the internal component directly.

Figure 2:
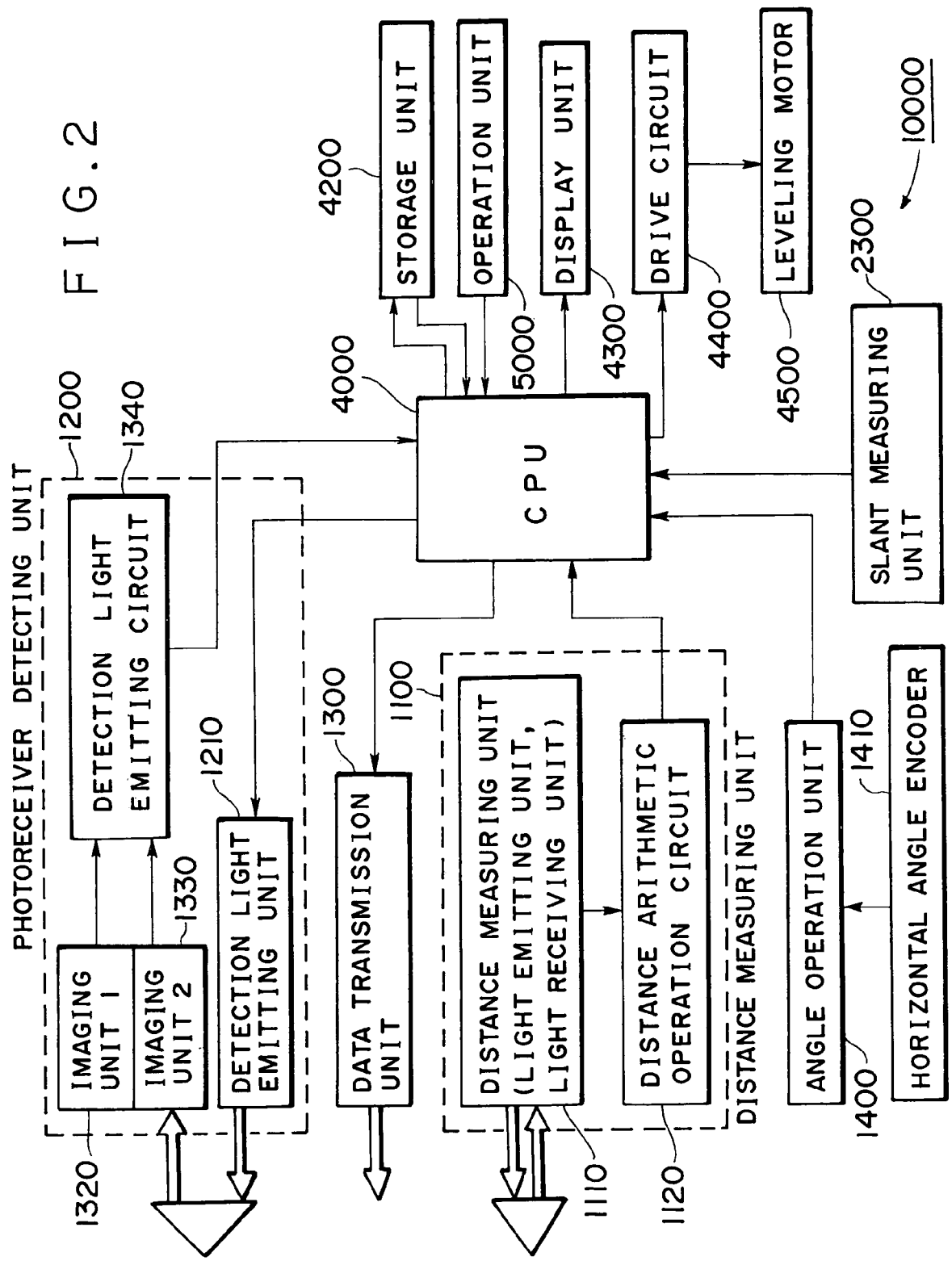
FIG. 2 is a diagram illustrating an electric configuration of the position detection instrument according to this embodiment.

Next, an electric configuration of the position detection instrument 10000 according to this embodiment will be described with reference to FIG. 2.

The position detection instrument 10000 comprises a distance measuring unit 1100, a photoreceiver detecting unit 1200, a data transmission unit 1300, an angle measuring unit 1400, a slant measuring unit 2300, a storage unit 4200, a display unit 4300, a drive circuit 4400, a motor 4500, an arithmetic processing means 4000, and an operation unit 5000.

Further, the slant measuring unit 2300 detects a rotation backlash, and a slant, of the rotating unit 2100 caused by the accuracy in rotation of bearings; and the arithmetic processing means 4000 corrects a light receiving position of the target to be measured, at which the light receiving unit receives light. As a result, the influence of the rotation backlash and the slant can be eliminated.

As for the distance measuring unit 1100, distance measuring light emitted from a distance-detection light emitting unit 2211 is reflected by a dichronic prism 2212, then after passes through an objective lens 2213, the distance measuring light is reflected by the rotating mirror 2110, and then is emitted in a direction of a target to be measured, which is not illustrated. The reflected light coming from the target to be measured, through a reverse path, is received by a light receiving element of a distance-detection light receiving unit 2214.

Incidentally, by use of a cylinder Fresnel lens 2215, it is possible to swing fan beam laser light expanding in an angular height direction relative to a horizontal plane while emitting pulses of light. The fan beam is light expanding in a fan-shaped manner.

The fan beam laser light used for distance measurement is reflected by a corner cube 21000 of a photoreceiver 20000, and is then detected by a light receiving element of the distance-detection light receiving unit 2214, which has the same visual field as that of the fan beam of the distance-detection light emitting unit 2211 and has a different path.

A distance from the position detection instrument 10000 to the photoreceiver 20000 is calculated by a time difference from the time when the distance-detection light emitting unit 2211 emits pulses of light till the distance-detection light receiving unit 2214 receives the pulses of light. It is to be noted that this arithmetic operation is executed by a distance arithmetic operation circuit 1120. Additionally, the distance-detection light emitting unit 2211 and the distance-detection light receiving unit 2214 correspond to a distance measuring unit 1110.

Because a horizontal-direction angle of a distance measuring light axis, and a horizontal-direction angle of an optical axis of a photoreceiver detecting unit 1200, are predetermined, distance data about the distance from the position detection instrument 10000 to the photoreceiver 20000, which has been determined by the distance measuring unit 1100, can be associated with data about the angular height and the horizontal angle that have been determined by the photoreceiver detecting unit 1200.

Incidentally, because visible light is not used as distance measuring light in this embodiment, a visible light cutoff filter 2216 is used.

The photoreceiver detecting unit 1200 comprises a detection light emitting unit 1210, a first imaging unit 1320, a second imaging unit 1330, and a detection light detecting circuit 1340.

Light emitted from the detection light emitting unit 1210 is reflected by the corner cube 21000 of the target 30000. The reflected light is then received by the first imaging unit 1320 and the second imaging unit 1330.

In this embodiment, the first imaging unit 1320 and the second imaging unit 1330 use a solid-state image sensing device such as a CCD.

By use of an objective lens 1212, the detection light emitting unit 1210 collimates, in the vertical direction, light emitted by, for instance, the pulsed laser diode 1211 located in the main body. Further, the collimated light is bent by a mirror at right angles, and is then spread out by a diffusing plate 1213. Consequently, a visual field of the first imaging unit 1320 and that of the second imaging unit 1330 are illuminated with the light.

In a state in which the detection light emitting unit 1210 stays lit up, a video signal of the first imaging unit 1320 and that of the second imaging unit 1330 include reflected light from the detection light emitting unit 1210, which is reflected by the corner cube 21000 of the photoreceiver 20000. On the other hand, in a state in which the detection light emitting unit 1210 is turned off, the video signals do not include the reflected light from the corner cube 21000.

Therefore, if a difference between the video signal in the on state of the detection light emitting unit 1210 and the video signal in the off state is determined, which are output from the first imaging unit 1320 and the second imaging unit 1330, only reflected light from the corner cube 21000 remains as a video signal. Accordingly, by determining a position of the reflected light in an image, it is possible to detect a center position of the target on the first imaging unit 1320 and the second imaging unit 1330.

Moreover, by use of the result of the detection, it is possible to determine a deviation of a light axis O of the photoreceiver detecting unit 1200 from a center position of photoreceiver 20000.

Figure 3:
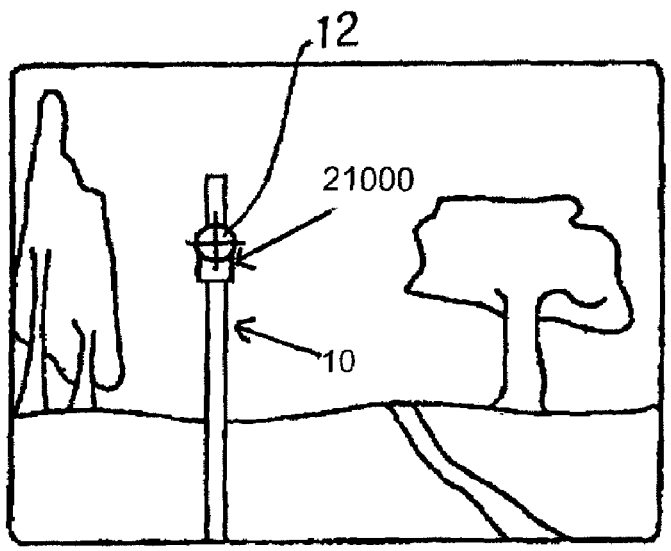
FIGS. 3(A) and 3(B) are diagrams illustrating principles of the present invention.
Figure 3:
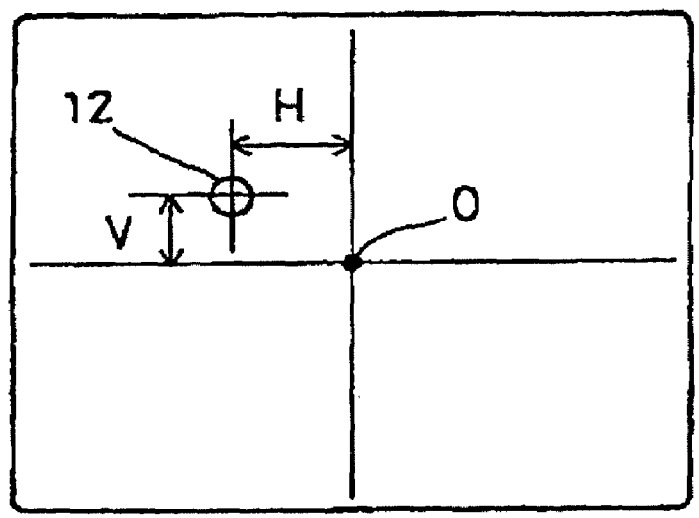

FIG. 3(A) illustrates a circumferential image including the corner cube 21000 placed on a tripod 10. If the detection light emitting unit 1210 emits light, not only visible light but also an image of returning light from corner cube 21000 is repeatedly obtained. Accordingly, by determining a difference between an image formed when the detection light emitting unit is turned on and an image formed when the detection light emitting unit 1210 is turned off, it is possible to obtain, as shown in FIG. 3(B), an image formed only by reflected light (returning light) 12, a size of which is nearly the same as that of corner cube 21000. On the assumption that the center of a window agrees with said light axis O, it is possible to easily calculate from the image a horizontal-direction deviation H, and a vertical-direction deviation V, of said returning light 12.

Figure 4:
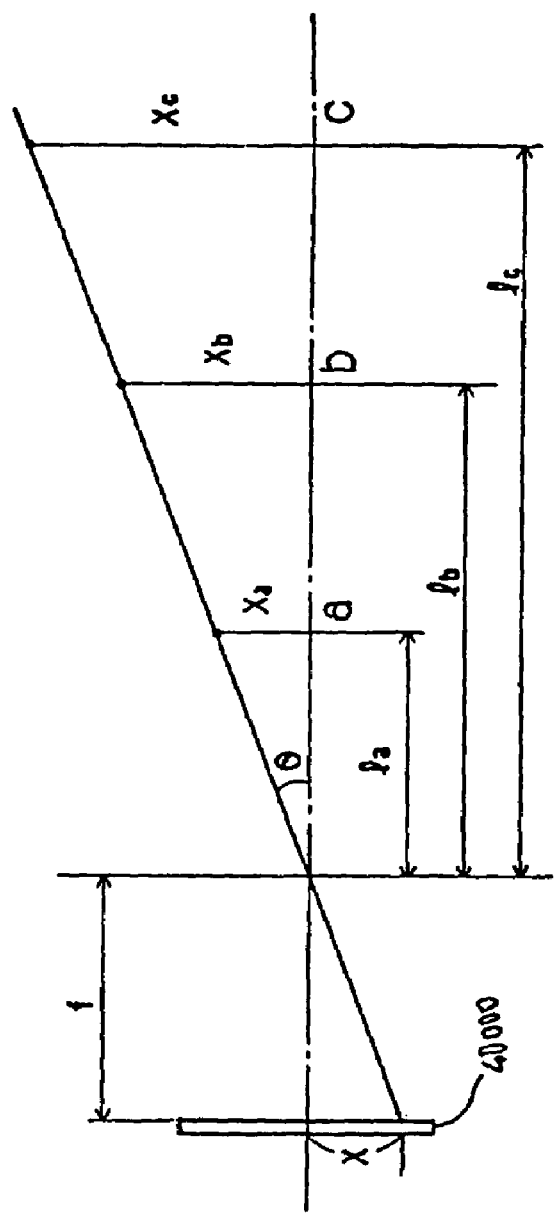
FIG. 4 is a diagram illustrating principles of the present invention.

In addition, as shown in FIG. 4, on the assumption that a solid-state image sensing device 40000 is placed at a position of a focal length f of a lens, and that an angle of returning light entering into the solid-state image sensing device 40000 is $\theta$, a deviation x from an optical axis 0 of the solid-state image sensing device 40000 is $f*\tan\theta$. Accordingly, the angle $\theta$ of the returning light which enters the solid-state image sensing device 40000 can be calculated by determining the deviation x. Therefore, regardless of distances to the corner cube 21000

1a, 1b, 1c, calculating a deviation H in the horizontal direction and a deviation V in the vertical direction, on an image, permits a deviation in horizontal angle, and a deviation in angular height, of the photoreceiver 20000 to be determined.

The photoreceiver detecting unit 1200 comprises the detection light emitting unit 1210, the first imaging unit 1320, the second imaging unit 1330, and the detection light detecting circuit 1340.

An optical system of the photoreceiver detecting unit 1200 comprises an objective lens 1350 provided on the fixed unit 2200, the first imaging unit 1320, the second imaging unit 1330, a beam splitter 1360, a relay lens 1370, a diffraction grating 1380, and the mirror 2110 of the swinging unit 2100.

Light from the first imaging unit 1320 is reflected by the beam splitter 1360, which is provided at a focal position of the objective lens 1350.

The first imaging unit 1320 has a wide visual field in the vertical direction, and exists in the center of the swinging unit 2100. The first imaging unit 1320 has a wide visual field along the perimeter direction because an optical axis is bent in the vertical and horizontal directions by the mirror 2110 of the swinging unit 2100.

Figure 7:
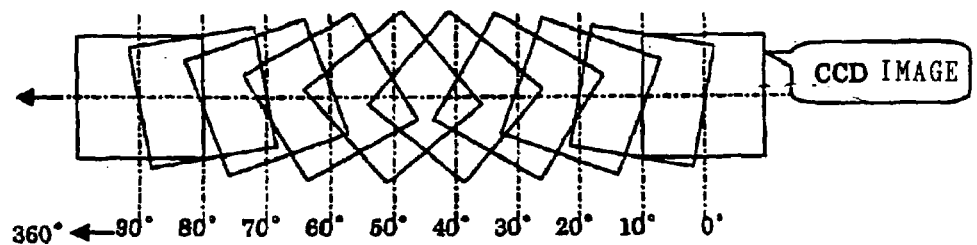
FIG. 7 is a diagram illustrating principles of the present invention.
Figure 8:
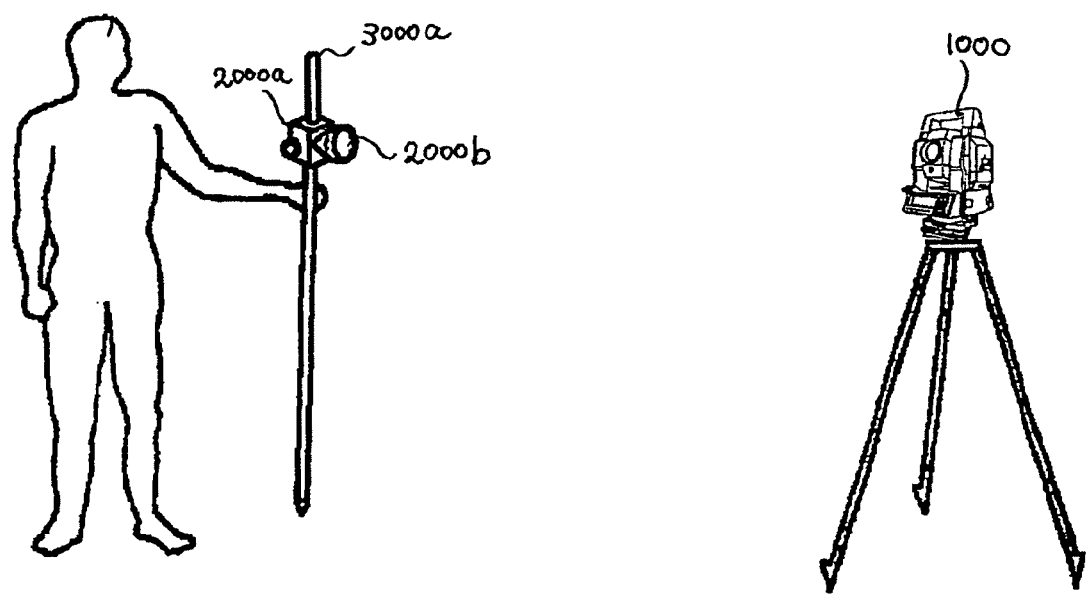
FIG. 8 is a diagram illustrating the prior art.

The mirror 2110 exists in the swinging unit 2100, and the first imaging unit 1320 exists in the fixed unit 2200. Accordingly, as shown in FIG. 7, an image of the photoreceiver 20000 is formed in a manner that the image is rotated by an angle at which the mirror 2110 is directed.

A horizontal angle and an angular height, from the position detection instrument 10000 to the photoreceiver 20000, can be determined by information about an image-formation position of a photoreceiver's image (substantially, a corner cube image) that is formed on the first imaging unit 1320, and by the angle at which the mirror 2110 is directed.

A resolution angle of a CCD is determined by the number of picture elements and a viewing angle of the CCD. The resolution angle decreases with increase in number of picture elements and decrease in viewing angle.

For this reason, the second imaging unit 1330 is placed at a position beyond the beam splitter 1360, the relay lens 1370, and the diffraction grating 1380 so that the second imaging unit 1330 can be used in combination with the first imaging unit 1320.

Because a viewing angle of the second imaging unit 1330 is narrowed by the relay lens 1370, a resolution angle becomes smaller as compared with that of the first imaging unit 1320.

Map data, for instance, is stored on a storage unit 4200 if required. Together with the map data, three-dimensional position information on the basis of measured data is displayed on the display unit 4300. Further, linking with the data and the information, the image obtained by the position detection instrument 10000 is also displayed. Moreover, using application software for converting image data, the data and the information may also be converted into an image such as a panorama before they are displayed.

By use of the same optical system as the distance measuring unit 1100, a data transmitting unit 1300 swings while emitting fan beam laser light expanding in an angular height direction relative to a horizontal plane. If an emission optical system is shared, a dichroic mirror 1310 for combining light used for optical communication and distance measuring light, each of which has a wavelength different from each other, is required.

In addition, an optical communication receiving unit 9100 of the photoreceiver 20000 requires a filter that passes only light of an optical communication use luminous element 1320.

A horizontal angle and an angular height which are associated with the photoreceiver 20000 are transmitted only while the data transmitting unit 1300 of the position detection instrument 10000 faces the photoreceiver 20000.

If there is a plurality of photoreceivers 20000, a plurality of horizontal angles and a plurality of angular heights are associated with the photoreceivers 20000. The associated data are transmitted only while the data transmitting unit 1300 of the position detection instrument 10000 faces each of the photoreceivers 20000.

Associating directions of the photoreceivers 20000 makes it possible to handle the plurality of photoreceivers 20000 at the same time.

Figure 5:
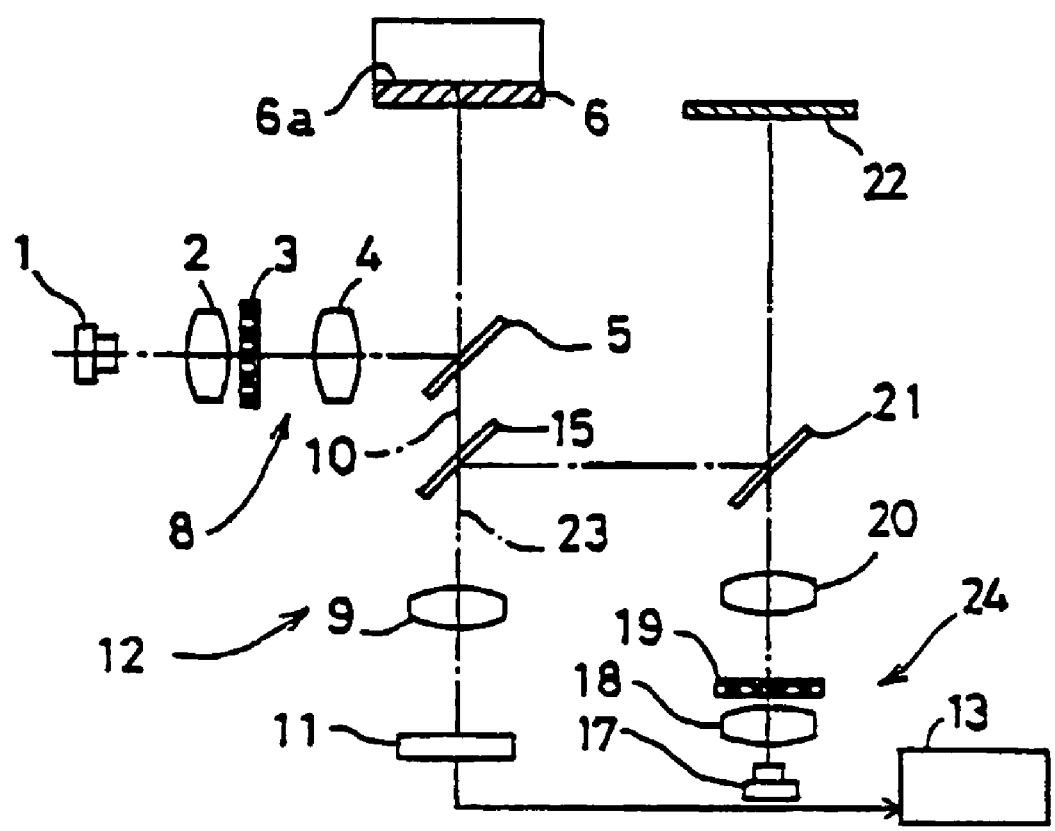
FIG. 5 is a diagram illustrating a slant measuring unit according to this embodiment.

The slant measuring unit 2300 will be described with reference to FIG. 5.

The slant measuring unit 2300 comprises a slant detecting unit and a rotation deviation detecting unit. The slant measuring unit 2300 detects a slant of the surveying-instrument main body 2000, and thereby horizontally levels the surveying-instrument main body 2000 using the slant as a control signal of the leveling unit 3000. The slant measuring unit 2300 detects a slant of the swinging unit 2100 by detecting a slant of an encoder which is provided in such a manner that the encoder and the vertical axis 2170 perpendicular to a horizontal reference form one body. Then, the slant measuring unit 2300 corrects a measured value, a distance value, and a position value according to the detected slant.

The slant measuring unit 2300 comprises a first light source 1, a first condensing lens 2, a first pattern 3, a second condensing lens 4, and a first half mirror 5. The slant measuring unit 2300 constitutes a free fluid level light-projecting system 8.

A light beam reflected by the first half mirror 5 is reflected by the free fluid level 6a, and then passes through the first half mirror 5. A second half mirror 15, a third condensing lens 9, and a light receiving means 11 are placed on a transmitted light axis 10 of the first half mirror 5. For example, a CCD area sensor is used as the light receiving means 11.

A second light source 17 which has a projected light axis parallel to the transmitted light axis 10 of the first half mirror 5 is placed. On a projected light axis of the second light source 17, a fourth condensing lens 18, a second pattern 19, a fifth condensing lens 20, and a third half mirror 21 are placed. The third half mirror 21 faces the second half mirror 15.

On a transmitted light axis of the third half mirror 21, a reflection member 22 (horizontal encoder) is placed at a position which is perpendicular to the transmitted light axis. The reflection member 22 utilizes a surface of the horizontal encoder as a reflection plane. The horizontal encoder is mounted in such a manner that the horizontal encoder and the vertical axis 2170 of the rotating unit 2100 form one body. Moreover, the rotating unit 2100 is supported by the vertical axis 2170, which is mounted to the cabinet of the surveying-instrument main body 2000, so that the rotating unit 2100 can rotate horizontally. In addition to it, the rotating unit 2100 is mounted so that when the slant measuring unit 2300 is appropriately installed so as to become horizontal, a reflection plane of the reflection member 22 also becomes approximate horizontal.

The second light source 17, the fourth condensing lens 18, the second pattern 19, the fifth condensing lens 20, the third half mirror the 21 and the like constitute a fixed reflection member light-projecting system 24. The first half mirror 5, the second half mirror 15, the third half mirror 21, the third condensing lens 9, the light receiving means 11 and the like constitute a light receiving optical system 12.

Thus, a light beam emitted from the first light source 1 is condensed by the first condensing lens 2 so that the light beam becomes an approximately parallel luminous flux. After passing through the first pattern 3 and the second condensing lens 4, the light beam is reflected by the first half mirror 5, and is further reflected by the free fluid level 6a. Then, the light beam passes through the first half mirror 5, the second half mirror 15, and the third the condensing lens 9 before the light beam is received by the light receiving means 11. To be more specific, a first pattern image 3a (not illustrated) of the first pattern 3 is formed on the light receiving means 11 by the third condensing lens 9.

In addition, a light beam emitted from the second light source 17 is condensed by the fourth condensing lens 18 so that the light beam becomes an approximately parallel luminous flux. Then, the light beam passes through the second pattern 19, and also passes through the fifth condensing lens 20 and the third half mirror 21. After that, the light beam is reflected by the reflection member 22, and further reflected by the third half mirror 21 and the second half mirror 15 before it is received by the light receiving means 11 through the third condensing lens 9. To be more specific, a second pattern image 19a (not illustrated) of the second pattern 19 is formed on the light receiving means 11 through the third condensing lens 9.

In this connection, the reflected light axis 23 in a state in which the second half mirror 15 reflects the light reflected from the reflection member 22 is coincident with the transmitted light axis 10 if the transmitted light axis 10 is vertical. Accordingly, the first pattern image 3a of the first pattern 3 is coincident with the second pattern image 19a of the second pattern 19.

The transmitted light axis 10 is given when the free fluid level 6a reflects a light beam. Accordingly, if a slant detector itself slants, the free fluid level 6a of the liquid member 6 slants relative to the slant detector itself. As a result, the reflected light axis 23 declines relative to an incident light axis.

As described above, if the free fluid level 6a slants by θ, the reflected light axis declines by 2nθ—where a refractive index of a liquid member 6 is n. Accordingly, on the light receiving means 11, the first pattern image 3a shifts by f*tan (2nθ) from a reference position.

On the other hand, a projected light axis of the reflection member light-projecting system 24 is vertically fixed if the surveying-instrument main body 2000 is horizontally leveled. In addition, if the horizontal encoder which is the reflection member 22 has no backlash and no slant, and rotates horizontally, a light receiving position (position of the second pattern image 19a) of a light beam, which is reflected by the reflection member 22, in the light receiving means 11 is kept constant.

On the contrary, if the horizontal encoder which is the reflection member 22 has a rotation backlash and an inclination, it is detected as a shifting distance L of the second pattern image 19a relative to the first pattern image 3a. It is possible to detect a slant direction by detecting a direction of the second pattern image 19a relative to the first pattern 3a of the light receiving means 11.

In the processing means 4000, a deviation of the first pattern image 3a from the second pattern image 19a is determined on the basis of a light receiving signal from the light receiving means 11. Further, the slant quantity and a slant direction are calculated on the basis of the deviation.

The present invention includes a slant sensor used for automatic leveling. Although the accuracy of the slant sensor is low, it covers a wide measuring range. As a slant sensor that covers a wide measuring range in spite of low accuracy, there are, for instance, a sensor which converts the motion of bubbles of a general bubble tube into an electric signal, and the like.

The leveling unit 3000 is devised to perform leveling operation so as to be within a measuring range of the slant measuring unit 2300 on the basis of a signal from the slant sensor covering a wide measuring range in spite of low accuracy. Incidentally, if the accuracy of the slant sensor is high and its measuring range is also wide, the slant measuring unit 2300 can also be replaced with the slant sensor. Moreover, even if the accuracy of the slant sensor is high and its measuring range is narrow, if a slant direction out of the measuring range can be judged by an output signal of the slant sensor, the slant measuring unit 2300 can be replaced with the slant sensor.

In this connection, the first pattern image 3a and the second pattern image 19a in the light receiving optical system 12 are used to detect a relative moving distance of an image from a horizontal state. Therefore, in a state in which the slant measuring unit 2300 itself is horizontal, the reflected light axis 23 from the reflection member 22 and the reflected light axis 23 from the free fluid level 6a are not necessarily coincident with each other, or are not necessarily parallel to each other. Moreover, the first pattern image 3a and the second pattern image 19a are not necessarily coincident with each other on the light receiving means 11 in a state in which the slant measuring unit 2300 itself is horizontal. The amount of deviation between both images may be used as a correction value at the time of calculation.

Figure 6:
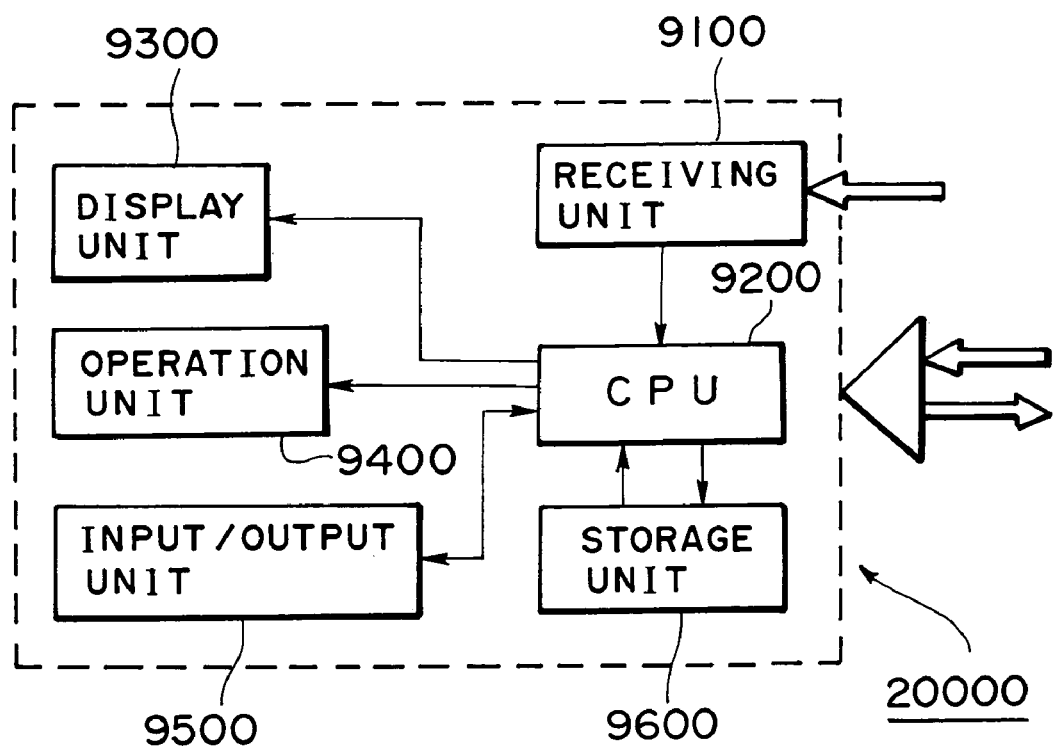
FIG. 6 is a diagram illustrating a photoreceiver according to this embodiment.

As shown in FIG. 6, the photoreceiver 20000 comprises the corner cube 21000, the optical communication receiving unit 9100, an operation unit 9200, an arithmetic operation data displaying unit 9300, an operation unit 9400, an input/output unit 9500, and a storage unit 9600.

The position detection instrument 10000 detects a position of the photoreceiver 20000, and then converts the position into three-dimensional position information signal before transmitting the signal. The optical communication receiving unit 9100 is used to receive the signal. The operation unit 9200 converts the signal into data in a local coordinate system which is set. The converted data is then displayed on the arithmetic operation data displaying unit 9300.

The position detection instrument 10000 according to the present invention is an instrument that emits tracking light and distance measuring light in a fan-shaped manner while turning directions of the tracking light and the distance measuring light in the horizontal direction, and that detects the target 30000 coming within a range of the emittance and then measures its position.

A horizontal direction is approximately detected by the horizontal angle encoder 2180 provided on the swinging unit 2100, and a horizontal angle is corrected by use of video from an area sensor provided on the photoreceiver detecting unit 1200, and thereby an angular height is calculated. Because fan-shaped measuring light is used, it is assumed that a range of use with reference to a horizontal plane is applied. However, general survey work is usually in this range.

As described above, an area sensor used in the position detection instrument 10000 is an image sensor capable of capturing an image (for example, a CCD). Image data captured from the image sensor is used to detect a position of the photoreceiver 20000. In addition to it, transmitting the image data to the photoreceiver 20000 side makes it possible to use the image data as an image linked with position data.

Further, using application software for converting image data, the image data can also be converted into an image such as a panorama before displaying the image.

A detection routine of the position detection instrument 10000, which is used for detecting the photoreceiver 20000, will be described as below.

To start with, while swinging a rotary head, on the basis of data of the angle operation unit 1400, the first imaging unit 1320 captures an image up to a full-circle swing at intervals of an angle that is smaller than a horizontal-direction viewing angle of the first imaging unit 1320. The reason why an image capturing angle is made smaller than the horizontal-direction viewing angle is that image data can be captured along the whole circumference without omission.

At this time, the image contains image information other than the corner cube 21000 of the photoreceiver 20000. Therefore, it is not possible to identify only the corner cube 21000 of the photoreceiver 20000.

For this reason, from the second swing, an image is captured at intervals of the same angle as that of the first swing, and in addition to it, the pulsed laser diode 1211 of the detection light emitting unit 1210 emits pulses of light at the same time. The light emitted from the detection light emitting unit 1210 is reflected by the corner cube 21000 of the photoreceiver 20000, and is then received by the position detection instrument 10000.

Even if a CCD image of the corner cube 21000 is captured while swinging, the pulses of light emitted by the detection light emitting unit 1210 permits the CCD image to be captured without causing a deviation. The image data captured by the above-mentioned method is a combination of the image in the first swing and the image that is emitted by the detection light emitting unit 1210, and that is then reflected by the corner cube 21000 of the photoreceiver 20000.

Image data obtained by subtracting the image data in the first swing from the image data in and after the second swing can be identified as an image of the corner cube 21000 of the photoreceiver 20000. A horizontal angle, and an angular height, of the photoreceiver 2000 can be determined by detecting a center of gravity in an image of the corner cube 21000 of the determined photoreceiver 20000 to determine a center of the image of the corner cube 21000, and then by performing calculations using the determined position information and angle data of the angle detecting unit 1400 at the time when the image is captured.

In addition, the photoreceiver 20000 can also be identified in the same period. While rotating the rotary head, image data is captured from the first imaging unit 1320 on the basis of data of the angle detecting unit 1400. At this time, the image contains image information other than the corner cube 21000 of the photoreceiver 20000. Therefore, it is not possible to identify only the corner cube 21000 of the photoreceiver 20000.

Next, after capturing the image, the pulsed laser diode 1211 of the detection light emitting unit 1210 emits pulses of light. The light emitted from the detection light emitting unit 1210 is reflected by the corner cube 21000 of the photoreceiver 20000, and is then received by the position detection instrument 10000. The captured image data is a combination of the image captured in the beginning and the image that is emitted by the detection light emitting unit 1210, and that is then reflected by the corner cube 21000 of the photoreceiver 20000. Additionally, it is so devised that the image is rotated in response to the rotation of the swinging unit 2100 for a period equivalent to a time lag of the capturing.

By correcting an image by a rotation angle of the image on the basis of data of the angle detecting unit 1400, and then by subtracting, from the corrected image data, its previous image data, it is possible to identify the image as an image of the corner cube 21000 of the photoreceiver 20000.

A center of gravity in the image of the corner cube 21000 of the photoreceiver 20000, which is determined in the same manner, is detected to determine a center of the image of the corner cube 21000. After that, calculations are performed by use of the determined position information and an angle data of the angle detecting unit 1400 at the time when the image is captured. As a result, a horizontal angle, and an angular height, of the photoreceiver 2000 can be determined.

In order to capture image data along the whole circumference without omission, it is necessary to determine an image capturing angle in such a manner that the image capturing angle becomes narrower by a deviated angle of the image in response to a difference in capturing time.

As for the horizontal angle and the angular height which have been determined by the first imaging unit 1320, a resolution angle is large because a viewing angle of the CCD is wide. If a distance between the photoreceiver 20000 and the position detection instrument 10000 is short, no problem is produced. However, if the distance is long, a large error is produced when converting the image data into three-dimensional data. In such a case, the second imaging unit 1330 is used. A position of the corner cube 21000 of the photoreceiver 20000 can be identified by the first and second swings. Therefore, if there is the corner cube 21000 of the photoreceiver 20000 in a visual field of the second imaging unit 1330, the second imaging unit 1330 selectively captures an image to determine a horizontal angle, and an angular height, of the photoreceiver 20000. As for the determined angle data, as compared with the first imaging unit 1320, a resolution angle is smaller in proportion to a narrowing visual field of the second imaging unit 1330.

Moreover, an image formed on the CCD is divided into at least two by the diffraction grating 1380. A diffraction angle of the diffraction grating 1380 is configured not to be an integral multiple of a pixel width of the CCD. The angular resolution can be further improved by separating and calculating a plurality of images of the corner cube 21000 of the photoreceiver 20000, which have been formed on the second imaging unit 1330, and then by performing arithmetic processing for detecting a center of gravity of each separated image, and lastly by leveling them. Accordingly, in a visual field range of the second imaging unit 1330, an angular height range of which is narrow relative to a horizontal plane, it is possible to keep high measurement accuracy over a long distance.

Although a lens system contains distortion, the distortion can also be eliminated by creating beforehand, at a reference position, calibration data for an optical system including the first imaging unit 1320 and the second imaging unit 1330, and then by subtracting an error at a stage of arithmetic processing that detects a position of the corner cube 21000.

In the present invention configured as described above, a light source unit emits measuring light, and then a light receiving unit receives its reflected light. A scanning means emits measuring light in a scanning direction, and leads its reflected light to the light receiving unit. An angle detector detects a rotational position of the scanning means. The measuring light includes distance measuring light expanding in a fan-shaped manner. Its reflected light can be used to measure a distance to a reflector. Work efficiency, therefore, can be improved to a large extent, which is a produced effect.

What is claimed is:

1. A position measuring instrument that irradiates a reflector with a measuring light to determine the distance to the reflector on the basis of the reflected light, comprising:
   a rotating unit comprising a rotating mirror and means for expanding the measuring light in a fan-shaped manner, wherein said fan-shaped manner expanding in an angular height direction relative to a horizontal plane;
   a fixed unit comprising a distance-detection light emitting unit which has the same visual field as that of the fan-shaped manner;
   a distance-detection light receiving unit; and
   an angle detector detecting the horizontal angle position of the rotating mirror, whereby the measuring light of fan-shape is guided from the fixed unit via the rotating mirror horizontally to the reflector and the measuring light reflected by the reflector is guided via the rotary mirror back to the fixed unit, further characterized by a horizontal angle and height angle detecting unit comprising a detection light emitting unit and an imaging unit and by a transmitter for transmitting image data from the imaging unit associated with position data of the reflector to a receiving unit of a photoreceiver comprising the reflector, wherein
   said measuring light includes collimation light;
   said light receiving unit has a collimation-use light receiving sensor for receiving the collimation light; and
   said collimation-use light receiving sensor detects a collimation center and deviation of the reflector by the reflected light.

2. A position measuring instrument according to claim 1, further comprising:
   a light-receiving unit having the collimation center, with a deviation of position of reflection light for the collimation center, and wherein the direction of the target reflector is obtained from a rotating position of an angle of detection.

3. A position measuring instrument according to claim 2, capable of obtaining a direction and distance to a plurality of reflectors.

4. A position measuring instrument according to claim 1, wherein a sending set sends a referenced data to an individual reflector, and based on a plurality of detection, transmit measurement data referenced to a reflected reflector.

5. A position measuring instrument according to claim 1, wherein image data captured by a light receiving unit is referred to the position data.

6. A position measuring instrument according to claim 1, further comprising a light-receiving unit and wherein image data captured by the light-receiving unit is revised based on the difference between image data received when target is illuminated and image data received when target is not illuminated.

* * * * *